Patented Feb. 2, 1954

2,668,162

UNITED STATES PATENT OFFICE 2,668,162

PREPARATION OF HIGH MOLECULAR WEIGHT POLYHYDROXYACETIC ESTER

Charles E. Lowe, Buffalo, N. Y., assignor to E. I. du Pont de Nemours and Company, Wilmington, Del., a corporation of Delaware No Drawing. Application March 20, 1952, Serial No. 277,726

7 Claims. (Cl. 260—78.3)

This invention relates to the preparation of polymeric plastic materials and more particularly to an improved process for preparing high molecular weight polyhydroxyacetic ester.

An object of the present invention is to produce by a simple and economical process, high molecular weight polyhydroxyacetic esters capable of being melt-extruded into strong orientable fibers and self-supporting thin film. Another object is to produce such polyhydroxyacetic esters directly from glycolide. These and other objects will more clearly appear hereinafter.

In processes heretofore employed for the preparation of high molecular weight polyhydroxyacetic esters of the general formula:

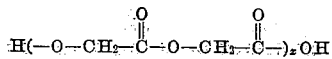

hydroxyacetic acid has been polymerized under the influence of heat and pressure, with the formation of a large proportion of glycolide,

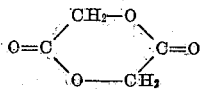

as a by-product of the reaction. I have now found that this by-product can also, under certain conditions hereinafter specified, be polymerized to produce fiber- and film-forming polyhydroxyacetic esters such as are produced by the before-mentioned polymerization of hydroxyacetic acid.

The present invention, therefore, briefly stated, comprises heating pure glycolide in the presence of a catalytic amount of an antimony compound from the group consisting of antimony trioxide and antimony trihalides.

More specifically, the present process comprises heating pure, dry glycolide in an inert atmosphere, i. e., in an atmosphere of nitrogen, in the presence of a catalytic quantity of an antimony compound from the group consisting of antimony trioxide and antimony trihalides at a temperature between 150° C. and 245° C. Preferably, the reaction is permitted to proceed at a temperature below the melting point of the polyhydroxyacetic ester in order to initiate polymerization, while minimizing darkening of the molten mass, for a period just short of the time at which solidification of the polymer produced commences; and thereafter the temperature is raised above the melting point to prevent solidification of the polymer to complete polymerization, and to permit melt extrusion. Usually, in the preparation of the polyhydroxyacetic ester from glycolide, the initial portion of the reaction is carried out at a temperature from 150° C.–200° C.; and thereafter the temperature is raised to 220° C.–245° C.

The melting point of the polyhydroxyacetic ester is in the neighborhood of 215° C.–220° C. Consequently, in the preferred procedure, the initial portion of the reaction is carried out at a temperature of from 150° C. to 200° C.; and the latter portion of the reaction is carried out within the range 220° C.–245° C. Usually, appreciable degradation of the polymer takes place above 245° C.; and it is preferred to carry out the latter portion of the reaction at a temperature only slightly, i. e., 5–10° C. above the melting point of the polymer. This is for the purpose of avoiding excessive exposure of the polymer to elevated temperatures, i. e., above the melting point.

While antimony trifluoride is the preferred catalyst, any antimony compound from the group consisting of antimony trioxide and antimony trihalides, such as antimony trichloride, antimony tribromide and antimony tri-iodide, effectively catalyzes the reaction. Catalyst concentrations ranging from 0.01% to 0.1% may be employed, and 0.03%, based upon the weight of glycolide or combined weights of glycolide and lactide or other lactides, is preferred. Usually, when the catalyst concentration is decreased below 0.01% or increased above 0.1%, the melt viscosity of the resulting polymer is lower than that which may be obtained operating within the specified range of catalyst concentration.

The process of the present invention may be employed with advantage to prepare copolymers of glycolide with small quantities, e. g., up to 15%, of other lactides such as lactide and disalicylide. For example, the preparation of a copolymer of 90/10 glycolide/lactide offers two advantages over the homopolymer of glycolide. One advantage is that the melting point of the copolymer is lower than the homopolymer, being in the neighborhood of 200° C.; and the entire reaction can be conducted at approximately the melting point of the copolymer. Operation at the lower temperatures decreases the rate of degradation of the polymer which gives a polymer of lighter color. Another advantage is that the copolymer can be successfully quenched when being extruded into film because the copolymer is less crystalline. On the other hand, the homopolymer shows a greater tendency to crystallize on extrusion and thereby tends to form opaque areas in the film.

The presence of water or acid impurities in glycolide tends to retard polymerization, and the resulting polyhydroxyacetic ester will not have a molecular weight suitable for extrusion into films or filaments. For example, polymerization of impure glycolide usually results in the formation of a polymer having a melt viscosity less than 400 poises, while pure glycolide gives polymers having melt viscosities up to 50,000 poises. However, polyhydroxyacetic esters having melt viscosities substantially greater than 27,000 poises are extremely difficult to extrude into films or filaments.

Pure, dry (i. e., anhydrous) glycolide may conveniently be prepared in high yield by the depolymerization of low molecular weight polyhydroxyacetic ester which is formed as a by-product in various known processes of converting hydroxyacetic acid directly to high molecular weight polyhydroxyacetic ester. The following example typifies the preparation of glycolide by this method:

Example A

A charge of 4,000 parts of crude hydroxyacetic acid flake was heated at atmospheric pressure until the temperature of the liquid reached 175–185° C. The temperature was maintained at this range for 2 hours or silghtly longer until water ceased to distill. The pressure was then reduced over a period of ½ hour to 150 mm. of mercury; and the temperature was maintained between 175–185° C. for 2 hours, or, again for a slightly longer time, until water ceased to distill. The product obtained was poured into an enamel pan and, after solidification, the white, brittle polymer was reduced to a free-flowing powder in a cutting machine. 2,972 parts of polyhydroxyacetic ester (low molecular weight material having a melt viscosity of less than 50 poises) were obtained (97.4% of the theoretical amount) while the water collected amounted to 932 parts (98.2% of the theoretical amount). The 97 parts unaccounted for (2.4%) were lost on transfer.

The apparatus for depolymerizing the above polyhydroxyacetic ester to form glycolide consisted of a three-necked reaction vessel equipped with a stainless steel stirrer, and provision for introducing the powdered polymer in increments through one neck and for take-off of the glycolide distillate through a downward connection tube wound with an electrical strip heater. A supply vessel containing the powdered polymer was attached by means of heavy-walled, flexible tubing to a stopcock so that the portion above the stopcock could be alternately filled and discharged into the reaction vessel. A steady stream of nitrogen was introduced through the polymer inlet tube to prevent accumulation of glycolide distillate and consequent plugging. A receiver was cooled in an ice water bath and equipped with an air condenser to trap most of the uncondensed glycolide. Since the nitrogen stream tended to carry glycolide beyond the receiver, three traps were interposed to protect the pump. One trap was a three-necked vessel filled with steel wool and immersed in an ice water bath, and the other two were standard Dry Ice-acetone traps.

1,000 parts of powdered, low molecular weight polymer produced as previously described were thoroughly mixed with 10 parts of antimony trioxide and placed in the supply vessel. The polymer was introduced from the supply vessel into the reaction vessel maintained at 270–285° C. at the rate of 200 parts per hour in five-part increments with the pressure of the system maintained at 12–15 mm. of mercury. A 93% yield of crude glycolide distillate was collected as a white to light yellow solid in the receiver.

Polymerization of the crude glycolide as obtained according to the above process showed that it was necessary to purify the crude glycolide in order to obtain high yields of high molecular weight polyhydroxyacetic ester. The glycolide was purified by 2 or 3 recrystallizations from chemically pure ethyl acetate. In all cases, the crude glycolide was added to approximately twice its weight of ethyl acetate; solution was effected at the boiling point; decolorizing charcoal was added; and reflux continued for ½ hour. The solution was filtered while hot; cooled; and white glycolide crystals were obtained on filtering and drying. Further recrystallizations were conducted in a similar manner, but the decolorizing charcoal treatment was omitted.

The following examples of preferred embodiments will further serve to illustrate the principles and practice of the process of the present invention. Parts and percentages are by weight unless otherwise indicated:

In each of the following examples, pure glycolide, free from traces of water and acid impurities and having a melting point between 83.8–84.3° C., was employed.

Example 1

Antimony trifluoride (0.03% by weight of dry glycolide) was added to 2,300 parts of pure, dry glycolide in a closed reaction vessel. Nitrogen was allowed to pass over the surface of the material in the vessel. The reaction vessel was heated to 195° C. by means of an oil bath and the contents stirred for one hour at that temperature. Stirring was stopped at this point since the material had become too viscous; and heating at 195° C. was maintained for one more hour, after which the temperature was quickly raised to 230° C. and maintained for ½ hour. After solidification, the resulting polymer (M. P. 215–220° C.) was pulverized and further dried. The resulting polyhydroxyacetic ester had a melt viscosity of 20,000 poises at 245° C. and 6,900 poises at 255° C. The ground polymer was extruded into a tough, cold-drawable, stretchable, and self-supporting film. The film had a melt viscosity of 1,800 poises at 245° C.

The most characteristic single indication of plastic properties in high molecular weight polyhydroxyacetic esters is the ability of the polymer to form a highly viscous melt. Since the polymers degrade with increasing rapidity as the temperature is raised above the melting point, a standard temperature of 245° C. was selected for comparative tests. This is near the melting point but is sufficiently above it to avoid melting difficulties. It has been found that at 245° C. a polyhydroxyacetic ester must have a melt viscosity, measured by the method of Flory (Journal of the American Chemical Society, 62, 1057 (1940)), of at least 400 poises before it can be molded into useful shaped articles, the preferred viscosity range being from 1,000 to 10,000 poises for extrusion into fibers and films. Below this limit, the polymer melt is too fluid and non-adherent to handle properly during forming operations; and the shaped products are increasingly brittle, non-cohesive and weak. On the other hand, the melt viscosity can be so high that the polymer is difficult to mold or extrude.

Example 2

Antimony trichloride (approximately 0.10% by weight of dry glycolide) was added to 10 parts of pure, dry glycolide in a tubular reaction vessel. On heating to 240° C. by means of an oil bath for ½ hour, a viscous, non-flowing polymer was formed.

Example 3

Antimony trioxide (0.03% by weight of dry glycolide) was added to 20.0 parts of pure, dry glycolide in a tubular reaction vessel (diameter 0.5″) provided with a side-arm near the top of the tube. Nitrogen was allowed to pass over the surface of the material in the tube end out through the side-arm. The tube was heated to 155° C. by means of a vapor bath and maintained at that temperature for 2 hours. Then the temperature was raised to 241° C. in an appropriate vapor bath. After 1.8 hours at 241° C., a polymer was produced having a melt viscosity of 4,300 poises at 241° C.

Example 4

Antimony trifluoride (0.03% based upon the combined weight of glycolide and lactide) was added to 4.5 parts of pure, dry glycolide and 0.5 part of pure, dry lactide in a reaction vessel. Nitrogen was allowed to pass over the surface of the material in the vessel. The reaction vessel was heated to 195–200° C. by means of an oil bath and maintained at that temperature for 2½ hours. Stirring of the reaction mixture was stopped after one hour because the material became too viscous. The resulting polymer was allowed to cool, and the solidified material was pulverized to a powder. After further drying, the polymer (M. P. 200–205° C.) had a melt viscosity of 15,000 poises at 218° C. and a melt viscosity of 7,000 poises at 245° C. The polymer was extruded into a tough, clear, cold-drawable, stretchable and self-supporting film at 210° C. The resulting film had a melt viscosity of 1,300 poises at 218° C.

A particular advantage of the present invention is that it provides a process of forming high molecular weight polyhydroxyacetic esters by polymerizing a by-product of known processes for preparing the polymeric ester, glycolide. A further advantage is that it provides a process for the preparation of high molecular weight polyhydroxyacetic esters in high yields. A still further advantage is that the present process provides a comparatively rapid process of preparing high molecular weight polyhydroxyacetic esters.

As many widely different embodiments may be made without departing from the spirit and scope of my invention, it is to be understood that said invention is in no way restricted save as set forth in the following claims.

I claim:

1. A process for preparing polyhydroxyacetic esters which comprises polymerizing glycolide by heating glycolide, free of water and acid impurities, at a temperature of from about 150° C. to about 245° C. in the presence of a catalytic amount of an antimony compound from the group consisting of antimony trioxide and antimony trihalides.

2. A process for preparing polyhydroxyacetic esters which comprises heating glycolide, free of water and acid impurities, at a temperature of from about 150° C. to about 245° C. in the presence of from 0.01% to 1.0% by weight, based on the weight of glycolide, of an antimony compound from the group consisting of antimony trioxide and antimony trihalides.

3. The process of claim 2 wherein the polymerization is carried out in an inert atmosphere.

4. The process of claim 2 wherein 0.03% by weight of antimony compound is used.

5. The process of claim 2 wherein the antimony compound is antimony trifluoride.

6. A process for preparing polyhydroxyacetic ester homopolymer which comprises polymerizing glycolide by initially heating glycolide, free of water and acid impurities, in an atmosphere of inert gas, at a temperature of from 150° C. to 200° C., to form a low molecular weight polymer, and thereafter heating the polymer at a temperature of from 220° C. to 245° C. until a polymer having a melt viscosity at 245° C. of at least 400 poises is obtained, the entire reaction being carried out in the presence of from 0.01% to 1.0% by weight, based on the weight of glycolide, of an antimony compound from the group consisting of antimony trioxide and antimony trihalides as catalyst.

7. The process of claim 6 wherein the polymerization reaction is carried out in an atmosphere of nitrogen gas and in the presence of about 0.03% by weight, based on the weight of glycolide, of antimony trifluoride.

CHARLES E. LOWE.

References Cited in the file of this patent

UNITED STATES PATENTS

| Number | Name | Date |
|---|---|---|
| 2,585,427 | Beck | Feb. 12, 1952 |